US008779634B2

(12) United States Patent
Tsutada et al.

(10) Patent No.: US 8,779,634 B2
(45) Date of Patent: Jul. 15, 2014

(54) TRANSFORMER INRUSH CURRENT SUPPRESSION APPARATUS WITH FUNCTION OF DETERMINING TARGET CLOSING PHASE OF THREE-PHASE TRANSFORMER BASED ON PRE-ARC CHARACTERISTIC AND VARIATION IN CLOSING TIME OF THE THREE-PHASE CIRCUIT BREAKER

(75) Inventors: Hiroyuki Tsutada, Tokyo (JP); Takashi Hirai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 662 days.

(21) Appl. No.: 13/121,026

(22) PCT Filed: Sep. 25, 2009

(86) PCT No.: PCT/JP2009/066631
§ 371 (c)(1),
(2), (4) Date: Mar. 25, 2011

(87) PCT Pub. No.: WO2010/035778
PCT Pub. Date: Apr. 1, 2010

(65) Prior Publication Data
US 2011/0204870 A1 Aug. 25, 2011

(30) Foreign Application Priority Data
Sep. 26, 2008 (JP) .................. 2008-248149

(51) Int. Cl.
*H01F 30/00* (2006.01)
*H02H 7/04* (2006.01)

(52) U.S. Cl.
USPC .............................. 307/127; 361/38; 361/111

(58) Field of Classification Search
USPC ..................................... 307/127; 361/38, 111
See application file for complete search history.

(56) References Cited

U.S. PATENT DOCUMENTS

| 6,433,980 B1 | 8/2002 | Tsutada et al. |
| 7,095,139 B2 | 8/2006 | Tsutada et al. |

(Continued)

FOREIGN PATENT DOCUMENTS

| EP | 2 091 058 A1 | 8/2009 |
| JP | 2 179220 | 7/1990 |

(Continued)

OTHER PUBLICATIONS

International Search Report issued Dec. 15, 2009 in PCT/JP09/066631 filed Sep. 25, 2009.

(Continued)

Primary Examiner — Hal Kaplan
(74) Attorney, Agent, or Firm — Oblon, Spivak, McClelland, Maier & Neustadt, L.L.P.

(57) ABSTRACT

A target closing phase determining circuit determines energization flux errors in respective phases and respective closing phases of a first phase, and determines a target closing phase of the first phase so as to minimize an evaluated value related to determined energization flux errors in the respective phases. Each of the energization flux errors is the maximum value of absolute values of center values of transformer fluxes generated in a static state after energization. The target closing phase determining circuit determines the energization flux errors based on residual flux values for the first to third phases of a three-phase power supply, respectively, a pre-arc characteristic and a closing time variation characteristic of a three-phase circuit breaker, a connection condition of windings of a three-phase transformer, to which the three-phase circuit breaker is connected, and voltage phase differences among the phases of the three-phase power supply.

4 Claims, 6 Drawing Sheets

(56) References Cited

U.S. PATENT DOCUMENTS

| | | | |
|---|---|---|---|
| 8,310,106 B2 * | 11/2012 | Koshiduka et al. ........... 307/101 |
| 2006/0018068 A1 | 1/2006 | Kinoshita et al. |
| 2010/0141235 A1 | 6/2010 | Koshiduka et al. |

FOREIGN PATENT DOCUMENTS

| | | |
|---|---|---|
| JP | 2685574 | 8/1997 |
| JP | 11 345546 | 12/1999 |
| JP | 11 353969 | 12/1999 |
| JP | 3456089 | 8/2003 |
| JP | 2004 208394 | 7/2004 |
| JP | 3716691 | 9/2005 |
| JP | 3804606 | 5/2006 |
| JP | 2008 140580 | 6/2008 |
| JP | 2008 160100 | 7/2008 |

OTHER PUBLICATIONS

The Extended European Search Report issued Sep. 12, 2013, in Application No./Patent No. 09816193.8-1806/2330708 PCT/JP2009066631.

* cited by examiner

TRANSFORMER INRUSH CURRENT SUPPRESSION APPARATUS WITH FUNCTION OF DETERMINING TARGET CLOSING PHASE OF THREE-PHASE TRANSFORMER BASED ON PRE-ARC CHARACTERISTIC AND VARIATION IN CLOSING TIME OF THE THREE-PHASE CIRCUIT BREAKER

TECHNICAL FIELD

The present invention relates to a transformer inrush current suppression apparatus for suppressing a magnetizing inrush current generated when a transformer is connected to a three-phase power supply via a three-phase circuit breaker, which energizes and de-energizes the transformer with the three-phase power supply by substantially simultaneous three-phase energizing.

BACKGROUND ART

As one method of suppressing a magnetizing inrush current in a transformer, there has been known a phase controlled energizing method of energizing a circuit breaker in a predetermined phase of a three-phase power supply. The present invention relates to a transformer inrush current suppression apparatus using the phase controlled energizing method.

This type of a conventional transformer inrush current suppression apparatus such as, for example, a transformer inrush current suppression apparatus disclosed in Patent Document 1 operates as follows. The transformer inrush current suppression apparatus lowers phase voltages of respective phases by using step-down means for lowering phase voltages of a three-phase transformer so that the phase voltages become suitable for input signals to an optimum energizing phase calculating apparatus serving as an electronic apparatus, where the phase voltages change transiently, and finally become zero when the three-phase transformer is de-energized. Then, using residual flux calculating means, the transformer inrush current suppression apparatus calculates residual fluxes in an iron-core of the three-phase transformer by time-integrating inputted signals of lowered three phase voltages. Using energizing phase calculating means, the transformer inrush current suppression apparatus calculates optimum energizing phases for the three phases, which do not cause the magnetizing inrush current and are different from each other, by using an equation derived from a relational equation among a magnetic flux at a time of the energization, an energizing phase and a residual flux. Calculation results of the optimum energizing phases are used as output signals from the optimum energizing phase calculating apparatus, and the output signals are used as energizing phase signals for a phase controlling apparatus for the circuit breaker. The circuit breaker is energized at the respective phase voltages individually.

In addition, a transformer inrush current suppression apparatus disclosed in Patent Document 2 sets one of the three phases to a first closing phase. A phase of zero degree of a standard phase is used as a reference point, and residual fluxes of the remaining two phases are assumed to be zero. Regarding each of the remaining two phases, the transformer inrush current suppression apparatus calculates a closing phase when an energization flux error becomes minimum, by associating an interpole voltage for each of the remaining two phases with a previously obtained pre-arc characteristic and a previously obtained closing time variation characteristic of the three-phase circuit breaker, and sets calculated closing phases to target closing phases for the remaining two phases. Each of the interpole voltages for the remaining two phases is a difference between a voltage on a power-supply-side and voltage on a transformer-side. The interpole voltages for the remaining two phases are smaller than a voltage value of an interpole voltage for the first closing phase, which is a difference between a voltage of the first closing phase on power-supply-side and a voltage of the first closing phase on a transformer-side of the first closing phase. The transformer inrush current suppression apparatus sets a target closing timing for each of the remaining two phases to a time interval obtained by adding a time interval from the reference point to the target closing phase of each of the remaining two phases, and a delay time previously set based on a time interval during which a direct-current component of the residual flux of each of the remaining two phases becomes zero after energization of the first closing phase. The delay time corresponds to an integral multiple of a time cycle of the three-phase power supply. Upon inputting a closing command, the transformer inrush current suppression apparatus closes the remaining two phases at the target closing timings, respectively.

CITATION LIST

Patent Document

Patent Document 1: Japanese Patent No. 2685574.
Patent Document 2: Japanese Patent No. 3804606.
Patent Document 3: Japanese Patent No. 3716691.

SUMMARY OF INVENTION

Technical Problem

However, in the transformer inrush current suppression apparatus disclosed in Patent Document 1, a mechanical variation in closing time and influences of a pre-arc of the circuit breaker are not considered when the energizing phases of the breaker are determined. Due to these factors, actual energization is sometimes carried out at a point offset from the optimum energizing phases, and in such a case, there has been such a problem that an excessive magnetizing inrush current flows. In addition, the transformer inrush current suppression apparatus disclosed in Patent Document 2 sets optimum target closing timings for the respective phases upon energizing the transformer with the three-phase power supply. Therefore, it is not possible to apply the transformer inrush current suppression apparatus disclosed in Patent Document 2 to the circuit breaker, which energizes and de-energizes a transformer with a three-phase power supply by simultaneous three-phase energizing.

It is an object of the present invention to provide a transformer inrush current suppression apparatus capable of solving the above problems, and capable of suppressing a magnetizing inrush current generated when a three-phase transformer is connected to a three-phase power supply via a three-phase circuit breaker, which energizes and de-energizes a transformer with a three-phase power supply by substantially simultaneous three-phase energizing.

Solution to Problem

A transformer inrush current suppression apparatus according to the present invention is a transformer inrush current suppression apparatus for suppressing a magnetizing inrush current generated by a three-phase transformer when the three-phase transformer is energized by a three-phase circuit breaker, which energizes the three-phase transformer with a three-phase power supply by simultaneous three-phase energizing. The transformer inrush current suppression apparatus includes target closing phase determining means and three-phase circuit breaker controller means. The target closing phase determining means calculates energization flux errors in first to third phases by changing a closing phase of the first phase within a range from 0 degree to 360 degrees, and determines a target closing phase which minimizes an evaluated value of the energization flux errors in the first to third phases, where each of the energization flux errors corresponding to a maximum offset amount of center values of transformer fluxes generated in a static state after the three-phase circuit breaker is energized when the three-phase circuit breaker is closed. The three-phase circuit breaker controller means controls the three-phase circuit breaker to be closed at the target closing phase determined by the target closing phase determining means. The target closing phase determining means calculates the energization flux errors in the first to third phases based on residual flux values for the first to third phases of the three-phase transformer, a variation in an inclination of a withstanding voltage line, the variation being due to a pre-arc characteristic of the three-phase circuit breaker, a variation in closing time of the three-phase circuit breaker, and a connection condition of windings of the three-phase transformer, to which the three-phase circuit breaker is connected, while changing the inclination of the withstanding voltage line and the closing time within ranges including values the inclination of the withstanding voltage line and the closing time can have.

Advantageous Effects of Invention

A transformer inrush current suppression apparatus according to the present invention is a transformer inrush current suppression apparatus for suppressing a magnetizing inrush current generated by a three-phase transformer when the three-phase transformer is energized by a three-phase circuit breaker, which energizes the three-phase transformer with a three-phase power supply by simultaneous three-phase energizing. The transformer inrush current suppression apparatus includes target closing phase determining means and three-phase circuit breaker controller means. The target closing phase determining means calculates energization flux errors in first to third phases by changing a closing phase of the first phase within a range from 0 degree to 360 degrees, and determines a target closing phase which minimizes an evaluated value of the energization flux errors in the first to third phases, where each of the energization flux errors corresponding to a maximum offset amount of center values of transformer fluxes generated in a static state after the three-phase circuit breaker is energized when the three-phase circuit breaker is closed. The three-phase circuit breaker controller means controls the three-phase circuit breaker to be closed at the target closing phase determined by the target closing phase determining means. The target closing phase determining means calculates the energization flux errors in the first to third phases based on residual flux values for the first to third phases of the three-phase transformer, a variation in an inclination of a withstanding voltage line, the variation being due to a pre-arc characteristic of the three-phase circuit breaker, a variation in closing time of the three-phase circuit breaker, and a connection condition of windings of the three-phase transformer, to which the three-phase circuit breaker is connected, while changing the inclination of the withstanding voltage line and the closing time within ranges including values the inclination of the withstanding voltage line and the closing time can have. Therefore, it is possible to suppress a magnetizing inrush current for all of the three phases.

DESCRIPTION OF EMBODIMENTS

Figure 1:
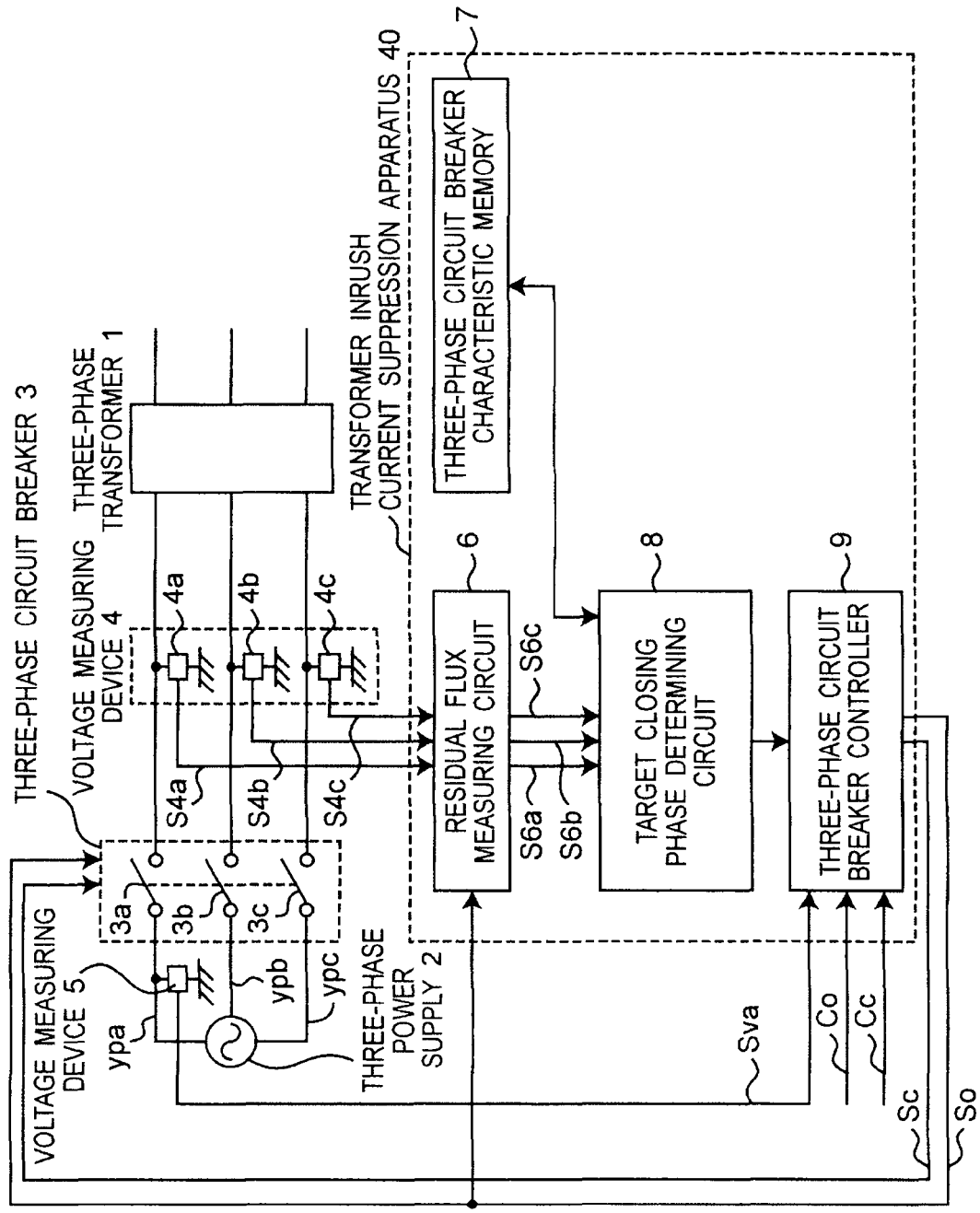
FIG. 1 is a block diagram showing a configuration of a transformer inrush current suppression apparatus 40 according to an embodiment 1 of the present invention.

Embodiments according to the present invention will be described below with reference to the attached drawings. Components similar to each other are denoted by the same reference numerals and will not be described herein in detail.

Embodiment 1

FIG. 1 is a block diagram showing a configuration of a transformer inrush current suppression apparatus 40 according to an embodiment 1 of the present invention. Referring to FIG. 1, the transformer inrush current suppression apparatus 40 is configured to include a residual flux measuring circuit 6, a three-phase circuit breaker characteristic memory 7, a target closing phase determining circuit 8, and a three-phase circuit breaker controller 9.

Referring to FIG. 1, a three-phase power supply 2 generates power-supply voltages ypa, ypb, and ypc of an A-phase, a B-phase, and a C-phase, respectively, and outputs the same voltages to contact shoes 3a, 3b, and 3c of a three-phase circuit breaker 3, respectively. In addition, the contact shoes 3a, 3b, and 3c of the three-phase circuit breaker 3 are connected to windings L1, L2, and L3 of the three-phase transformer 1, respectively, where the windings L1, L2, and L3 are provided at a side of the three-phase transformer 1, to which the three-phase circuit breaker 3 is provided.

Figure 2:
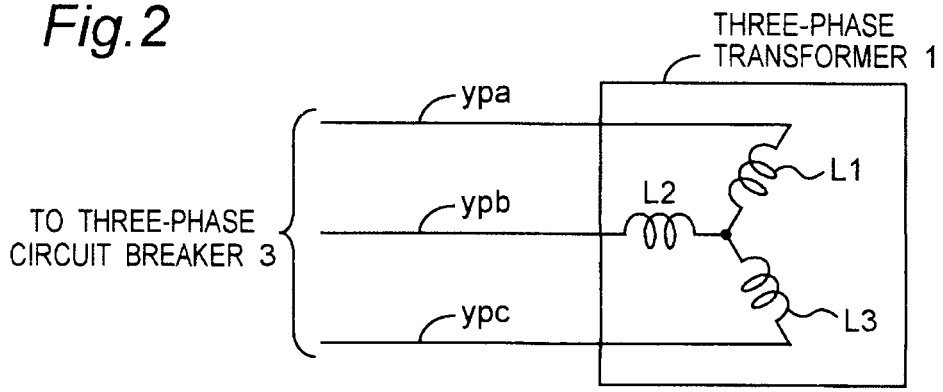
FIG. 2 is a circuit diagram showing a connection condition I, in which three windings L1, L2, and L3, to which a three-phase circuit breaker 3 is connected, are connected in a star connection and a neutral point of the star connection is not grounded.
Figure 3:
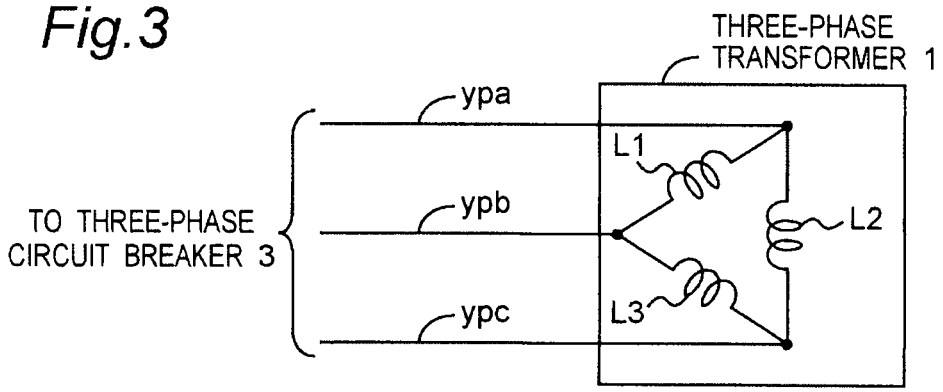
FIG. 3 is a circuit diagram showing a connection condition II, in which the windings L1, L2, and L3 are connected in a delta connection.
Figure 4:
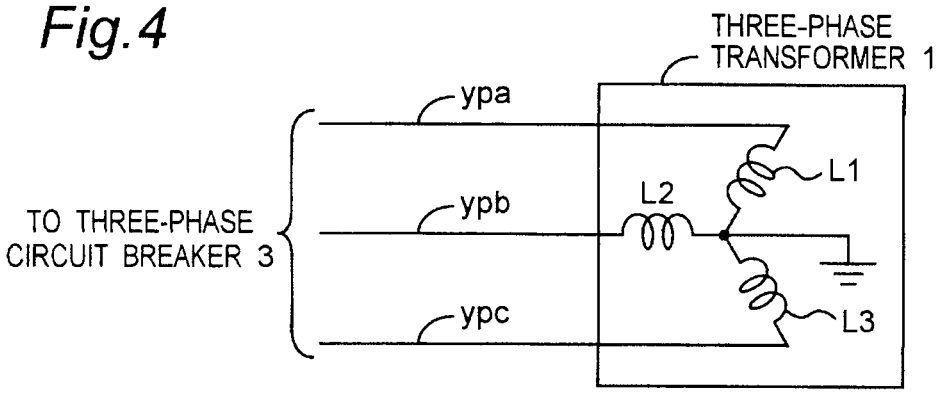
FIG. 4 is a circuit diagram showing a connection condition III, in which the windings L1, L2, and L3 are connected in the star connection and the neutral point of the star connection is grounded.

The three windings L1, L2, and L3 of the three-phase transformer 1, to which the three-phase circuit breaker 3 is connected, are connected to each other in one of connection conditions I, II, and III described below. FIG. 2 is a circuit diagram showing the connection condition I, in which the three windings L1, L2, and L3, to which the three-phase circuit breaker 3 is connected, are connected in a star connection (also referred to as a Y-connection) and a neutral point of the star connection is not grounded. FIG. 3 is a circuit diagram showing the connection condition II, in which the windings L1, L2, and L3 are connected in a delta connection. FIG. 4 is a circuit diagram showing the connection condition III, in which the windings L1, L2, and L3 are connected in the star connection and the neutral point of the star connection is grounded. It should be noted that windings (not shown in the drawings) of the three-phase transformer 1, to which the three-phase circuit breaker 3 is not connected, are connected in one of the connection conditions I to III. In addition, the three-phase transformer 1 is in a no-load condition in which the three-phase transformer 1 is not connected to any load.

In response to an opening control signal So and a closing control signal Sc from the three-phase circuit breaker controller 9, the contact shoes 3a, 3b, and 3c of the three-phase circuit breaker 3 are opened and closed, substantially simultaneously so as to be interlocked with each other. In addition, a voltage measuring device 5 measures a voltage to ground of the A-phase of a standard phase, generates a measured signal Sva representing a result of the measurement, and outputs the same signal to the three-phase circuit breaker controller 9. The voltage measuring device 4 includes voltage measuring devices 4a, 4b, and 4c. The voltage measuring devices 4a, 4b, and 4c measure voltages to ground of the A-phase, the B-phase, and the C-phase of the three-phase transformer 1, respectively, generate measured signals S4a, S4b, and S4c representing results of the measurement, and output the same signals to the residual flux measuring circuit 6. In this case, each of the voltage measuring devices 5, 4a, 4b, and 4c is configured to include an alternating voltage measuring sensor that is commonly used in high voltage circuits.

Figure 5:
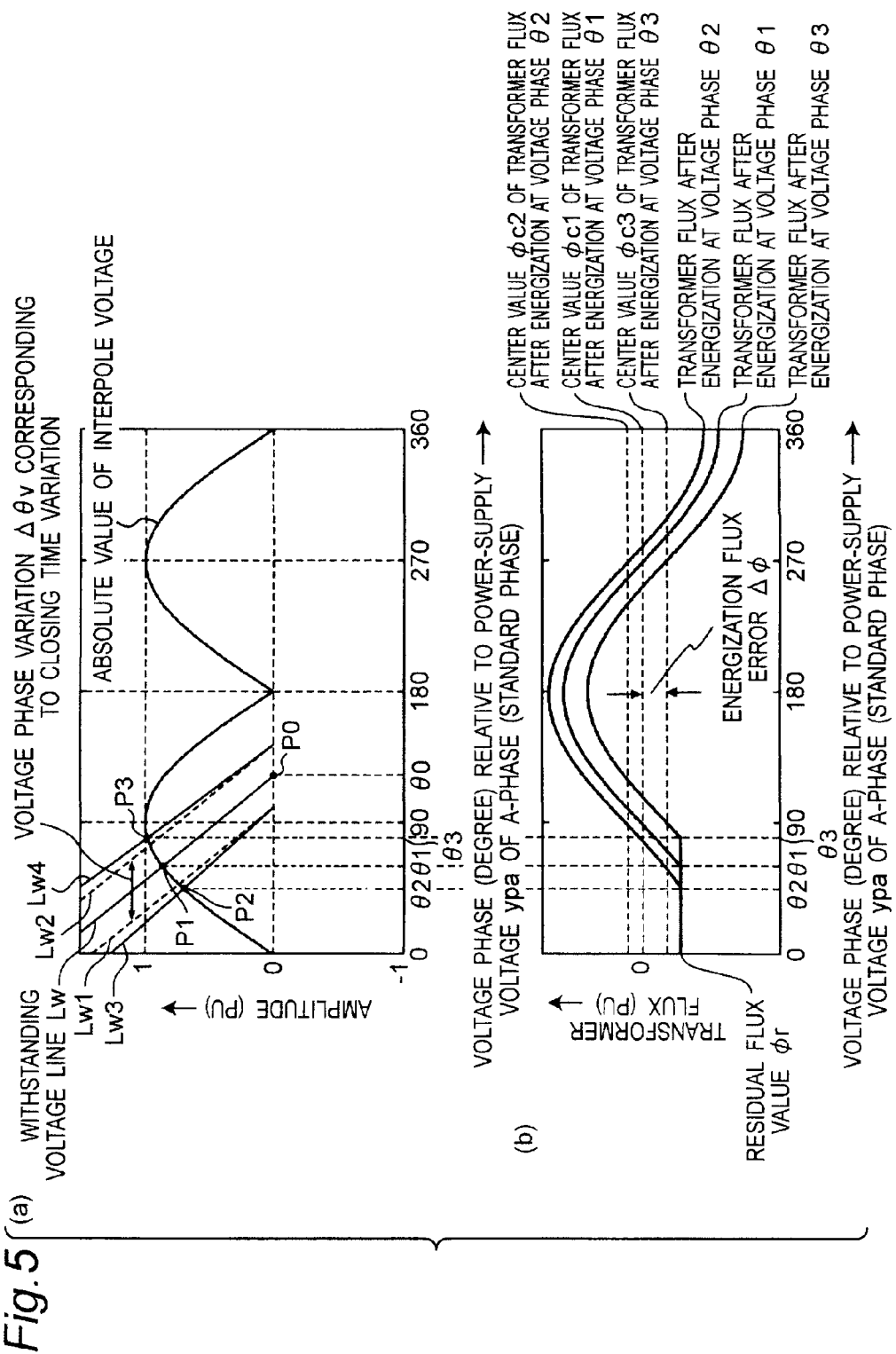
FIG. 5($a$) is a graph showing a pre-arc characteristic and a closing time variation characteristic of a three-phase circuit breaker 3 of FIG. 1, and FIG. 5($b$) is a graph showing transformer fluxes and center values $\phi c1$, $\phi c2$ and $\phi c3$ of the transformer fluxes after a contact shoe is energized at voltage phases $\theta c1$, $\theta c2$, and $\theta c3$ of FIG. 5($a$)

Next, referring to FIG. 5, a pre-arc characteristic and a closing time variation characteristic of the three-phase circuit breaker 3 are described. Referring to FIG. 5, FIG. 5(a) is a graph showing the pre-arc characteristic and the closing time variation characteristic of the three-phase circuit breaker 3 of FIG. 1. It should be noted that all of the contact shoes 3a, 3b, and 3c of the three-phase circuit breaker 3 have pre-arc characteristics the same as each other and closing time variation characteristics the same as each other. Each of the contact shoes 3a, 3b, and 3c will be simply referred to as a contact shoe or the three-phase circuit breaker 3 in the following description when the contact shoes 3a, 3b, and 3c are not distinguished from each other.

When the closing control signal Sc is outputted, in response to an inputted closing control signal Sc, each of the contact shoes 3a, 3b, and 3c of the three-phase circuit breaker 3 mechanically contacts after a lapse of a predetermined mechanical operating time interval. A timing when the contact shoe mechanically contacts is referred to as closing, and the mechanical operating time interval is referred to as a closing time. The closing time depends on an ambient temperature, an operating hydraulic pressure, a controlled voltage, and downtime of the three-phase circuit breaker 3. In addition, it is known that a main circuit current starts to flow through the contact shoe before closing due to a preceding discharge. The preceding discharge is referred to as a pre-arc, and a timing when the main circuit current starts to flow is referred to as energization. In this case, a timing of the energization depends on an absolute value of an interpole voltage, which is a voltage applied between poles of the contact shoe of the three-phase circuit breaker 3 as will be described later. In the following embodiments, a characteristic of the pre-arc of the contact shoe is referred to as the pre-arc characteristic. As described above, the contact shoes 3a, 3b, and 3c have the pre-arc characteristics the same as each other.

Further, each of the contact shoes has mechanical operating variation. A probability distribution of the timing, when the contact shoe is actually closed when the closing control signal is inputted at a predetermined timing, becomes a normal distribution distributed centering on a closing time corresponding to the predetermined timing. A characteristic of the variation of the closing time of the contact shoe is referred to as the closing time variation characteristic. The contact shoes 3a, 3b, and 3c have closing time variation characteristics the same as each other.

Referring to FIG. 5(a), a withstanding voltage line Lw represents a relation between a voltage phase of an interpole voltage of the contact shoe (referred to as a voltage phase of the contact shoe hereinafter) and a withstanding voltage value between poles of the contact shoe when the contact shoe is closed at a closing point P0 having a voltage phase θ0. When the absolute value of the interpole voltage is smaller than the withstanding voltage value, the contact shoe is not energized. At an energization point P1, which is an intersection between the withstanding voltage line Lw and the absolute value of the interpole voltage, the withstanding voltage value of the contact shoe is equal to the absolute value of the interpole voltage, and therefore, the pre-arc is generated to energize the contact. As described above, in the contact, a voltage phase θ1 at the energization point P1 is different from the voltage phase θ0 at closing. Therefore, it is required to consider the pre-arc characteristic when an optimum target closing phase is determined in order to suppress a magnetizing inrush current.

Further, since the contact shoe of the three-phase circuit breaker 3 has the closing time variation characteristic as described above, the contact shoe of the three-phase circuit breaker 3 is not necessarily energized at the energization point P1, even when controlled to be closed at a target closing phase θ0. Referring to FIG. 5(a), broken lines Lw1 and Lw2 show a variation range of the withstanding voltage line Lw when the closing time variation is ±1 millisecond (corresponding to a voltage phase variation Δθv). Further, since the contact shoe of the three-phase circuit breaker 3 has an interpole discharge variation, an inclination of the withstanding voltage line Lw varies. Referring to FIG. 5(a), solid lines Lw3 and Lw4 show a variation range of the withstanding voltage line Lw when the closing time variation is ±1 millisecond and the inclination of the withstanding voltage line Lw varies by ±10%. In the example shown in FIG. 5(a), considering the closing time variation of the contact shoe and the variation in the inclination of the withstanding voltage line Lw, the contact shoe is to be energized at any voltage phase between a voltage phase θ2 and a voltage phase θ3, even when the contact shoe is controlled to be closed at the target closing point P0. In this case, the voltage phase θ2 is a voltage phase of an intersection P2 between the withstanding voltage line Lw3 having the minimum withstanding voltage value and the absolute value of the interpole voltage, and the voltage phase θ3 is a voltage phase at an intersection P3 between the withstanding voltage line Lw4 having the maximum withstanding voltage value and the absolute value of the interpole voltage.

In this case, in a static state after the energization of the three-phase circuit breaker 3, a transformer flux having a sinusoidal wave shape is generated. In order to suppress the magnetizing inrush current generated by the three-phase transformer 1 after the three-phase circuit breaker 3 is energized, the contact shoe of the three-phase circuit breaker 3 should be energized at a voltage phase, which is fallen within a range from the voltage phase θ2 to the voltage phase θ3, and at which an absolute value of a center value (an average value of the maximum value and the minimum value) of the generated transformer flux having the sinusoidal wave shape is minimized. Referring to FIG. 5, FIG. 5(b) is a graph showing transformer fluxes and center values $\phi c1$, $\phi c2$, and $\phi c3$ of the transformer fluxes after the contact shoe is energized at voltage phases θ1, θ2, and θ3 of FIG. 5(a). Referring to FIG. 5(b), the maximum value of the absolute values of the center values of the transformer fluxes after the three-phase transformer 1 is energized at the respective voltage phases between the voltage phases θ2 and θ3 is defined as an energization flux error $\Delta\phi$. For example, in the example shown in FIG. 5(b), the energization flux error $\Delta\phi$ is an absolute value of the center value $\phi c3$ of the transformer flux when the three-phase transformer 1 is energized at the voltage phase θ3.

In the transformer inrush current suppression apparatus 40 of FIG. 1, the residual flux measuring circuit 6 includes three integrating circuits for integrating the measured signals S4a, S4b, and S4c from the voltage measuring device 4, respectively, and a calculating circuit. In response to the opening control signal So from the three-phase circuit breaker controller 9, the calculating circuit calculates residual flux values $\phi ra$, $\phi rb$, and $\phi rc$ for the respective phases after de-energization (opening) of the three-phase circuit breaker 3 based on the measured signals S4a, S4b, and S4c and signals representing integration results, and generates and outputs signals S6a, S6b, and S6c representing the residual flux values $\phi ra$, $\phi rb$, and $\phi rc$, respectively. After receiving the opening control signal So, the calculating circuit detects a timing when a voltage value of the A-phase converges to zero based on the measured signal S4a, and calculates the residual flux value $\phi ra$ for the A-phase based on the signal representing the integration result of the measured signal S4a at this timing. Further, the calculating circuit calculates the residual flux value $\phi rb$ for the B-phase and the residual flux value $\phi rc$ for the C-phase in a manner similar to that of the calculation of the residual flux value bra for the A-phase.

The three-phase circuit breaker characteristic memory 7 stores data relating to the pre-arc characteristic of the three-phase circuit breaker 3 previously measured, data relating to the closing time variation characteristic, and data relating to the connection conditions of the windings L1, L2, and L3 of the three-phase transformer 1, to which the three-phase circuit breaker 3 is connected. In this case, the data relating to the pre-arc characteristic includes a value of the inclination of the withstanding voltage line Lw and a value (%) of the variation in the inclination when an inclination of a tangential line of the power supply voltage when the voltage phase of the power supply voltage is 0 degree is defined as 1. The data relating to the closing time variation characteristic includes a value (milliseconds) of the variation in the closing time. In addition, the data relating to the connection conditions of the windings L1, L2, and L3 of the three-phase transformer 1, to which the three-phase circuit breaker 3 is connected, includes predetermined flag values representing the connection conditions I-III.

At a predetermined timing, the target closing phase determining circuit 8 reads out the respective data relating to the pre-arc characteristic and the closing time variation characteristic of the three-phase circuit breaker 3, and the data relating to the connection conditions of the windings of the three-phase transformer 1, to which the three-phase circuit breaker 3 is connected, from the three-phase circuit breaker characteristic memory 7. Then, the target closing phase determining circuit 8 calculates the energization flux errors $\Delta\phi a$, $\Delta\phi b$, and $\Delta\phi c$ in the respective phases at the respective closing phases of the standard phase as will be described later, based on the signals S6a, S6b, and S6c representing the residual flux values $\phi ra$, $\phi rb$, and $\phi rc$ from the residual flux measuring circuit 6, read-out data relating to the pre-arc characteristic and the closing time variation characteristic of the three-phase circuit breaker 3, the connection conditions of the windings of the three-phase transformer 1, to which the three-phase circuit breaker 3 is connected, and voltage phase differences (120 degrees) among the phases of the three-phase power supply 2. Further, the target closing phase determining circuit 8 determines a target closing phase θta of the standard phase (described as the A-phase hereinafter) so as to minimize the maximum values of the energization flux errors $\Delta\phi a$, $\Delta\phi b$, and $\Delta\phi c$ in the respective phases, generates a signal representing a determined target closing phase θta, and outputs the same signal to the three-phase circuit breaker controller 9.

In response to an opening command Co inputted from a controlling apparatus of a upper layer, the three-phase circuit breaker controller 9 generates the opening control signal So, and outputs the same signal to the three-phase circuit breaker 3 and the residual flux measuring circuit 6. In addition, in response to a closing command Cc inputted from the controlling apparatus of the upper layer, the three-phase circuit breaker controller 9 calculates an elapsed time interval (referred to as a target closing time) from a timing, when the voltage phase of the contact shoe 3a is 0 degree, to a timing corresponding to the target closing phase based on the target closing phase from the target closing phase determining circuit 8, and detects a timing when the voltage phase of the A-phase is 0 degree based on the measured signal Sva representing the voltage to ground of the A-phase from the voltage measuring device 5. Then, the three-phase circuit breaker controller 9 generates the closing control signal Sc so that the three-phase circuit breaker 3 is closed at a timing when the target closing timing has passed since the timing detected in the no-load state in which the three-phase transformer 1 is not connected to a load, and outputs the closing control signal Sc to the three-phase circuit breaker 3.

Next, a method of calculating the energization flux errors $\Delta\phi a$, $\Delta\phi b$, and $\Delta\phi c$ in the respective phases in the target closing phase determining circuit 8 is described. In the following descriptions, an amplitude of a magnetic flux of the three-phase transformer 1 when a rated voltage is applied is normalized by a rated value, and defined as 1 PU (Per Unit).

By changing a closing voltage phase (referred to as a closing phase hereinafter) θca relative to the power-supply voltage of the standard phase (the A-phase) within a range from 0 to 360 degrees at a predetermined interval (1 degree, for example), the target closing phase determining circuit 8 calculates the energization flux errors $\Delta\phi a$, $\Delta\phi b$, and $\Delta\phi c$ in the respective closing voltage phases in a manner described below.

When the closing time variation of each contact shoe of the three-phase circuit breaker 3 is ±1 millisecond, and the variation in the inclination of the withstanding voltage line is +10%, the target closing phase determining circuit 8 changes a closing voltage phase $\alpha$ of the A-phase, a closing voltage phase $\beta$ of the B-phase, and a closing voltage phase $\gamma$ of the C-phase within ranges represented by the following equations (1)-(3) at a predetermined interval. Using a center value ra of the inclination of the withstanding voltage line, the target closing phase determining circuit 8 changes an inclination "r" of the withstanding voltage line within a range represented by the following equation (4) at a predetermined interval:

$$(\theta ca - \Delta\theta v) \leq \alpha \leq (\theta ca + \Delta\theta v) \quad (1),$$

$$(\theta ca - \Delta\theta v) \leq \beta \leq (\theta ca + \Delta\theta v) \quad (2),$$

$$(\theta ca - \Delta\theta v) \leq \gamma \leq (\theta ca + \Delta\theta v) \quad (3), \text{ and}$$

$$ra \times 0.9 \leq r \leq ra \times 1.1 \quad (4).$$

In this case, in the equations (1)-(3), $\Delta\theta v$ denotes a magnitude of the voltage phase variation corresponding to a magnitude of the closing time variation (for example, 1 millisecond).

By changing the closing voltage phases $\alpha$, $\beta$, and $\gamma$ for the respective phases and the inclination "r" of the withstanding voltage line within the ranges of the equations (1) to (4), respectively, the target closing phase determining circuit 8 obtains respective energization voltage phases $\theta a$, $\theta b$, and $\theta c$, and absolute values $\phi ca$, $\phi cb$, and $\phi cc$ of the center values of the transformer fluxes after energization, and thereafter, obtains the energization flux errors $\Delta\phi a$, $\Delta\phi b$, and $\Delta\phi c$. Each of the energization voltage phases $\theta a$, $\theta b$, and $\theta c$ for the respective phases is a voltage phase of the intersection (for example, the intersection P1 of FIG. 5) between the withstanding voltage line and the absolute value of the interpole voltage. The energization flux errors $\Delta\phi a$, $\Delta\phi b$, and $\Delta\phi c$ are maximum values of the absolute values $\phi ca$, $\phi cb$, and $\phi cc$ of the center values of the transformer fluxes, respectively. In this case, the respective absolute values $\phi ca$, $\phi cb$, and $\phi cc$ of the center values of the transformer fluxes depend on the connection condition I, II, or III of the windings of the three-phase transformer 1, to which the three-phase circuit breaker 3 is connected, and the number of the phases that has been energized.

Next, a method of calculating the absolute values $\phi ca$, $\phi cb$, and $\phi cc$ of the center values of the transformer fluxes is described for each of the connection conditions I-III of the windings of the three-phase transformer 1, to which the three-phase circuit breaker 3 is connected. It should be noted that the power-supply voltages ypa, ypb, and ypc of the A-phase, the B-phase, and the C-phase are defined as follows, respectively, using a voltage phase $\theta$ of the A-phase:

$$ypa = \sin\theta,$$

$$ypb = \sin(\theta - 120°), \text{ and}$$

$$ypc = \sin(\theta - 240°).$$

I. A case of the connection condition I, in which the three windings L1, L2, and L3 of the three-phase transformer 1, to which the three-phase circuit breaker 3, is connected are connected in the star connection, and the neutral point of the star connection is not grounded:

(1) In First Phase Energization:

Transformer voltages yta, ytb, and ytc of the A-phase, the B-phase, and the C-phase are zero as shown below:

$$yta = 0,$$

$$ytb = 0, \text{ and}$$

$$ytc = 0.$$

In this case, interpole voltages yia, yib, and yic of the A-phase, the B-phase, and the C-phase are represented by the following equations:

$$yia = ypa - yta = ypa,$$

$$yib = ypb - ytb = ypb, \text{ and}$$

$$yic = ypc - ytc = ypc.$$

In addition, withstanding voltage lines ywa, ywb, and ywc of the A-phase, the B-phase, and the C-phase are represented by the following equations:

$$ywa = r \times (\theta - \alpha),$$

$$ywb = r \times (\theta - \beta), \text{ and}$$

$$ywc = r \times (\theta - \gamma).$$

Energization voltage phases for the respective phases are calculated by solving the following three equations for the voltage phase $\theta$, and an energization voltage phase of a phase that is energized first is obtained from among calculated energization voltage phases:

$$|yia| = ywa,$$

$$|yib| = ywb, \text{ and}$$

$$|yic| = ywc.$$

For example, assuming that the A-phase is energized first, it is determined that the phase of the A-phase is the energization voltage phase $\theta a$. It should be noted that, if the energizing phases of a plurality of phases are the same as each other, it is possible to determine the same phase to be the energization voltage phases of the plurality of phases.

(2) In Second Phase Energization:

Each of the transformer voltages yta, ytb, and ytc of the A-phase, the B-phase, and the C-phase after the first phase has been energized is the same as a power-supply voltage of a first energized phase. Therefore, for example, when the A-phase is the first energized phase, the transformer voltages yta, ytb, and ytc of the A-phase, the B-phase, and the C-phase are represented by the following equations, respectively:

$$yta = ypa,$$

$$ytb = ypa, \text{ and}$$

$$ytc = ypa.$$

In this case, the interpole voltages yia, yib, and yic of the A-phase, the B-phase, and the C-phase are represented by the following equations, respectively:

$$yia = ypa - yta = 0,$$

$$yib = ypb - ytb = ypb - ypa, \text{ and}$$

$$yic = ypc - ytc = ypc - ypa.$$

With regard to un-energized phases, which are, in this example, the B-phase and the C-phase, energization voltage phases for the respective phases are calculated by solving the following two equations for the voltage phase θ, and an energization voltage phase of a phase that is energized first is obtained from among calculated energization voltage phases:

$|yib|=ywb$, and $|yic|=ywc$.

For example, assuming that the B-phase is energized first, it is determined that the phase of the B-phase is the energization voltage phase θb. It should be noted that, if the energizing phases of a plurality of phases are the same as each other, it is possible to determine the same phase to be the energization voltage phases of the plurality of phases.

(3) In Third Phase Energization

With regard to the transformer voltages yta, ytb, and ytc of the A-phase, the B-phase, and the C-phase after the second phase has been energized, the transformer voltages of the energized phases are the same as the power-supply voltage, and the transformer voltage of the un-energized phase is the same as an average value of the power-supply voltages for the two energized phases. Therefore, for example, when the un-energized phase is the C-phase, the transformer voltages yta, ytb, and ytc of the A-phase, the B-phase, and the C-phase are represented by the following equations, respectively:

$yta=ypa$, $ytb=ypb$, and $ytc=(ypa+ypb)/2$.

In this case, the interpole voltages yia, yib, and yic of the A-phase, the B-phase, and the C-phase are represented by the following equations, respectively:

$yia=ypa-yta=0$, $yib=ypb-ytb=0$, and $yic=ypc-ytc=ypc-(ypa+ypb)/2$.

With regard to the un-energized phase, which is, in this example, the C-phase, the energization voltage phase θc for the C-phase is calculated by solving the following equation for the voltage phase θ, and the energization voltage phase θc is determined:

$|yic|=ywc$.

In this case, the absolute values φca, φcb, and φcc of the center values of the transformer fluxes after the three phases have been energized are obtained as follows, using an energization voltage phase Θ2 of the second energized phase.

(1) When the energization voltage phases θa and θb are equal to or smaller than the energizing phase θc (θa, θb≤θc):

$$\phi ca = \left| \phi ra + \frac{\sqrt{3}}{2}\sin(\Theta 2 - 240) - \frac{\sqrt{3}}{2}\sin(\theta c - 240) - \sin(\theta c - 90) \right|$$ [Equation 1]

$$\phi cb = \left| \phi rb - \frac{\sqrt{3}}{2}\sin(\Theta 2 - 240) + \frac{\sqrt{3}}{2}\sin(\theta c - 240) - \sin(\theta c - 210) \right|$$ [Equation 2]

$$\phi cc = |\phi rc - \sin(\theta c - 330)|$$ [Equation 3]

(2) When the energization voltage phases θb and θc are equal to or smaller than the energizing phase θa (θb, θc≤θa):

$$\phi ca = |\phi ra - \sin(\theta a - 90)|$$ [Equation 4]

$$\phi cb = \left| \phi rb + \frac{\sqrt{3}}{2}\sin(\Theta 2 - 0) - \frac{\sqrt{3}}{2}\sin(\theta a - 0) - \sin(\theta a - 210) \right|$$ [Equation 5]

$$\phi cc = \left| \phi rc - \frac{\sqrt{3}}{2}\sin(\Theta 2 - 0) + \frac{\sqrt{3}}{2}\sin(\theta a - 0) - \sin(\theta a - 330) \right|$$ [Equation 6]

(3) When the energization voltage phases θc and θa are equal to or smaller than the energizing phase θb (θc, θa≤θb):

$$\phi ca = \left| \phi ra - \frac{\sqrt{3}}{2}\sin(\Theta 2 - 120) + \frac{\sqrt{3}}{2}\sin(\theta b - 120) - \sin(\theta b - 90) \right|$$ [Equation 7]

$$\phi cb = |\phi rb - \sin(\theta b - 210)|$$ [Equation 8]

$$\phi cc = \left| \phi rc + \frac{\sqrt{3}}{2}\sin(\Theta 2 - 120) - \frac{\sqrt{3}}{2}\sin(\theta b - 120) - \sin(\theta b - 330) \right|$$ [Equation 9]

II. A case of the connection condition II, in which the three windings L1, L2, and L3 of the three-phase transformer 1, to which the three-phase circuit breaker 3 is connected, are connected in the delta connection:

The energization voltage phases θa, θb, and θc of the A-phase, the B-phase, and the C-phase are calculated in a manner similar to that of the connection condition I. Further, the absolute values φca, φcb, and φcc of the center values of the transformer fluxes after the energization of the three phases are obtained as follows, using the energization voltage phase Θ2 of the second energized phase and an energization voltage phase Θ3 of a third energized phase.

(1) When the energization voltage phases θa and θb are equal to or smaller than the energizing phase θc (θa, θb≤θc):

$$\phi ca = \left| \phi ra - \sqrt{3}\sin(\Theta 2 - 60) \right|$$ [Equation 10]

$$\phi cb = \left| \phi rb + \frac{\sqrt{3}}{2}\sin(\Theta 2 - 60) - \frac{\sqrt{3}}{2}\sin(\Theta 3 - 60) - \sqrt{3}\sin(\Theta 3 - 180) \right|$$ [Equation 11]

$$\phi cc = \left| \phi rc + \frac{\sqrt{3}}{2}\sin(\Theta 2 - 60) - \frac{\sqrt{3}}{2}\sin(\Theta 3 - 60) - \sqrt{3}\sin(\Theta 3 - 300) \right|$$ [Equation 12]

(2) When the energization voltage phases θb and θc are equal to or smaller than the energizing phase θa (θb, θc≤θa):

$$\phi ca = \left| \phi ra + \frac{\sqrt{3}}{2}\sin(\Theta 2 - 180) - \frac{\sqrt{3}}{2}\sin(\Theta 3 - 180) - \sqrt{3}\sin(\Theta 3 - 60) \right|$$ [Equation 13]

-continued $$\phi cb = |\phi rb - \sqrt{3}\sin(\Theta 2 - 180)| \qquad \text{[Equation 14]}$$

$$\phi cc = \left|\phi rc + \frac{\sqrt{3}}{2}\sin(\Theta 2 - 180) - \frac{\sqrt{3}}{2}\sin(\Theta 3 - 180) - \sqrt{3}\sin(\Theta 3 - 300)\right| \qquad \text{[Equation 15]}$$

(3) When the energization voltage phases θc and θa are equal to or smaller than the energizing phase θb (θc, θa≤θb):

$$\phi ca = \left|\phi ra + \frac{\sqrt{3}}{2}\sin(\Theta 2 - 300) - \frac{\sqrt{3}}{2}\sin(\Theta 3 - 300) - \sqrt{3}\sin(\Theta 3 - 60)\right| \qquad \text{[Equation 16]}$$

$$\phi cb = \left|\phi rb + \frac{\sqrt{3}}{2}\sin(\Theta 2 - 300) - \frac{\sqrt{3}}{2}\sin(\Theta 3 - 300) - \sqrt{3}\sin(\Theta 3 - 180)\right| \qquad \text{[Equation 17]}$$

$$\phi cc = |\phi rc - \sqrt{3}\sin(\Theta 2 - 300)| \qquad \text{[Equation 18]}$$

III. A case of the connection condition III, in which the three windings L1, L2, and L3 of the three-phase transformer 1, to which the three-phase circuit breaker 3 is connected are connected in the star connection, and the neutral point of the star connection is grounded:

(1) In First Phase Energization:

The energization voltage phases are calculated in a manner similar to that in the first phase energization in the connection conditions I and II as described above.

(2) In Second and Third Phase Energization:

After the first phase has been energized, the transformer voltage corresponding to the first energized phase is the same as the power-supply voltage of the first energized phase, and the transformer voltages of the remaining two phases become ½ of a reverse phase of the power-supply voltage of the first energized phase. Therefore, for example, when the A-phase is the first energized phase, the transformer voltages yta, ytb, and ytc of the A-phase, the B-phase, and the C-phase are represented by the following equations, respectively:

yta=ypa, ytb=−ypa/2, and ytc=−ypa/2.

In this case, the interpole voltages yia, yib, and yic of the A-phase, the B-phase, and the C-phase are represented by the following equations, respectively:

yia=ypa−yta=0, yib=ypb−ytb=ypb+ypa/2, and yic=ypc−ytc=ypc+ypa/2.

With respect to the un-energized phases, which are, in this example, the B-phase and the C-phase, energization voltage phases for the respective phases are calculated by solving the following two equations for the voltage phase θ, and an energization voltage phase of a phase that is energized first is obtained from among calculated energization voltage phases:

|yib|=ywb, and

|yic|=ywc.

For example, assuming that the B-phase is energized first, it is determined that the phase of the B-phase is the energization voltage phase θb. It should be noted that, upon energization of the two phases, the magnetic flux of a remaining phase generated by the transformer is similar to the transformer flux after the energization of the three phases. Therefore, the energization voltage phase θc of the remaining one phase is also the same as the energization voltage phase θb of the B-phase.

In this case, the absolute values φca, φcb, and φcc of the center values of the transformer fluxes after the three phases have been energized are obtained as follows, using the energization voltage phase Θ2 of the second energized phase.

(1) When the energization voltage phase θa is equal to or smaller than the energizing phases θb and θc (θa≤θb, θc):

$$\phi ca = |\phi ra - \sin(\theta a - 90)| \qquad \text{[Equation 19]}$$

$$\phi cb = \left|\phi rb + \frac{\sin(\theta a - 90)}{2} - \frac{\sin(\Theta 2 - 90)}{2} - \sin(\Theta 2 - 210)\right| \qquad \text{[Equation 20]}$$

$$\phi cc = \left|\phi rc + \frac{\sin(\theta a - 90)}{2} - \frac{\sin(\Theta 2 - 90)}{2} - \sin(\Theta 2 - 330)\right| \qquad \text{[Equation 21]}$$

(2) When the energization voltage phase θb is equal to or smaller than the energizing phases θc and θa (θb≤θc, θa):

$$\phi ca = \left|\phi ra + \frac{\sin(\theta b - 210)}{2} - \frac{\sin(\Theta 2 - 210)}{2} - \sin(\Theta 2 - 90)\right| \qquad \text{[Equation 22]}$$

$$\phi cb = |\phi rb - \sin(\theta b - 210)| \qquad \text{[Equation 23]}$$

$$\phi cc = \left|\phi rc + \frac{\sin(\theta b - 210)}{2} - \frac{\sin(\Theta 2 - 210)}{2} - \sin(\Theta 2 - 330)\right| \qquad \text{[Equation 24]}$$

(3) When the energization voltage phase θc is equal to or smaller than the energizing phases θa and θb (θc≤θa, θb):

$$\phi ca = \left|\phi ra + \frac{\sin(\theta c - 330)}{2} - \frac{\sin(\Theta 2 - 330)}{2} - \sin(\Theta 2 - 90)\right| \qquad \text{[Equation 25]}$$

$$\phi cb = \left|\phi rb + \frac{\sin(\theta c - 330)}{2} - \frac{\sin(\Theta 2 - 330)}{2} - \sin(\Theta 2 - 210)\right| \qquad \text{[Equation 26]}$$

$$\phi cc = |\phi rc - \sin(\theta c - 330)| \qquad \text{[Equation 27]}$$

Within the ranges of the equations (1) to (4), maximum values are calculated for the absolute values φca, φcb, and φcc of the center values of the transformer fluxes for the respective phases after the energization of the three phases obtained as described above, as the energization flux errors Δφa, Δφb, and Δφc in the respective phases at the closing phase θca.

Figure 6:
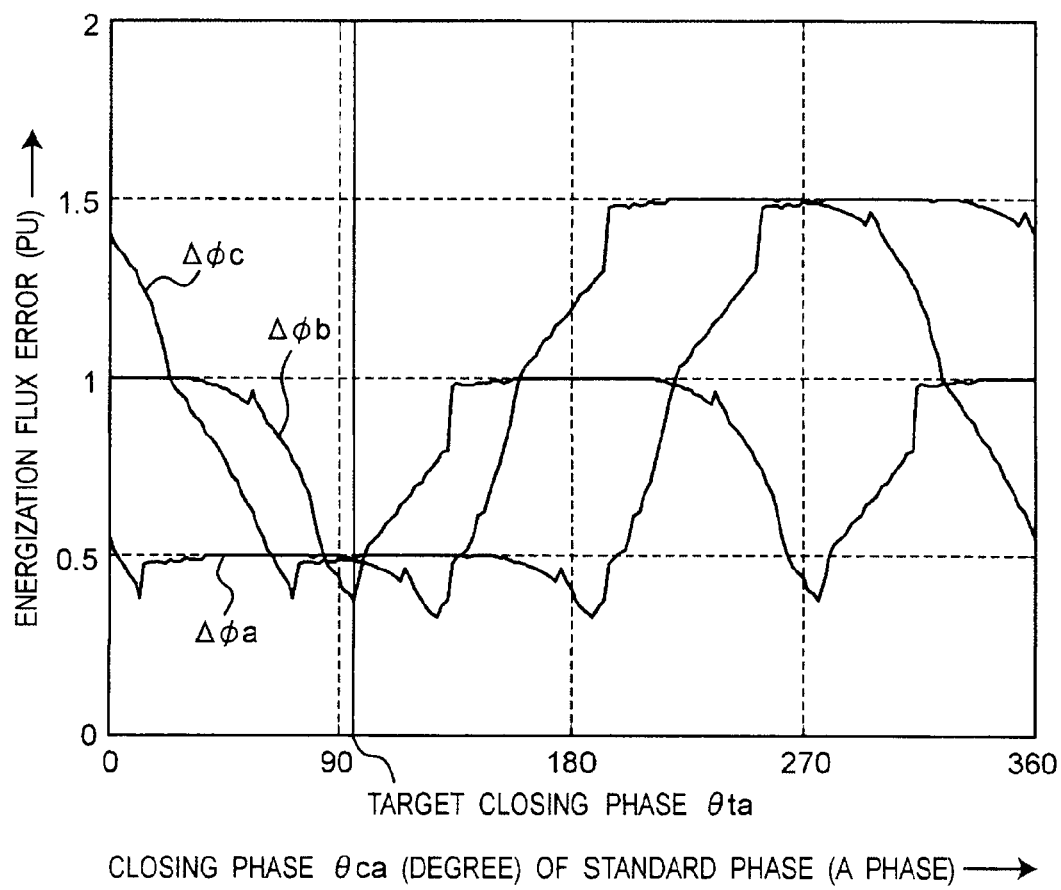
FIG. 6 is a graph showing an example of energization flux errors $\Delta\phi a$, $\Delta\phi b$, and $\Delta\phi c$ in an A-phase, a B-phase, and a C-phase, respectively, with respect to a closing phase $\theta ca$, where the energization flux errors $\Delta\phi a$, $\Delta\phi b$, and $\Delta\phi c$ are calculated by a target closing phase determining circuit 8 of FIG. 1.

FIG. 6 is a graph showing an example of the energization flux errors Δφa, Δφb, and Δφc in the A-phase, the B-phase, and the C-phase, respectively, with respect to the closing phase θca, where the energization flux errors Δφa, Δφb, and Δφc are calculated by the target closing phase determining circuit 8 of FIG. 1. It should be noted that the following values are assumed in FIG. 6:

(1) the connection condition is the connection condition I (star connection and neutral non-grounding);

(2) the value of the closing time variation=±1 millisecond;

(3) the inclination of the withstanding voltage line=0.8, where the inclination of the tangential line is 1 when the power-supply voltage is 0 degree;

(4) the variation in the inclination of the withstanding voltage line=±10%;

(5) the residual flux value φra of the A-phase=−0.5 PU;

(6) the residual flux value φrb of the B-phase=0 PU; and (7) the residual flux value φrc of the C-phase=+0.5 PU.

Next, a method of determining the target closing phase θta of the standard phase (A-phase) by the target closing phase determining circuit 8 is described with reference to FIG. 6. The target closing phase determining circuit 8 determines the closing voltage phase θca of the A-phase among voltage phases from 0 to 360 degrees in FIG. 6, so as to minimize the maximum value of the respective energization flux errors Δφa, Δφb, and Δφc in the three phases. In the example shown in FIG. 6, since the maximum value of the respective energization flux errors Δφa, Δφb, and Δφc in the three phases are minimized when the closing phase θca of the A-phase is 96 degrees, the target closing phase θta is determined to be 96 degrees.

Figure 7:
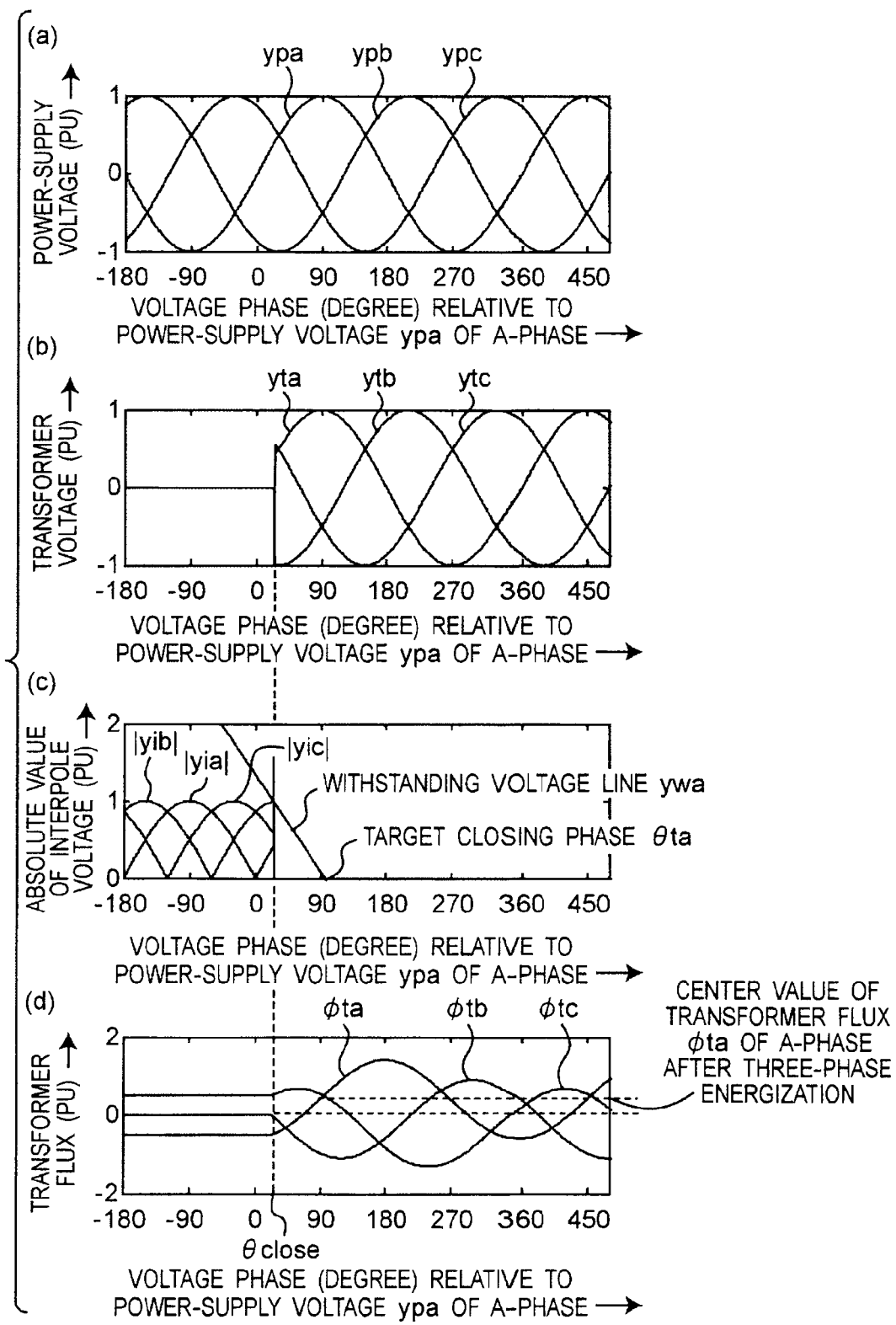
FIG. 7($a$) is a graph showing power-supply voltages ypa, ypb, and ypc of the A-phase, the B-phase, and the C-phase, respectively, FIG. 7($b$) is a graph showing transformer voltages yta, ytb, and ytc of the A-phase, the B-phase, and the C-phase, respectively, when the three-phase circuit breaker 3 is closed at a target closing phase $\theta ta$ of FIG. 6 and energized at a voltage phase $\theta close$, FIG. 7($c$) is a graph showing absolute values |yia|, |yib|, |yic| of interpole voltages of the A-phase, the B-phase, and the C-phase, respectively, and a withstanding voltage line ywa when the three-phase circuit breaker 3 is closed at the target closing phase $\theta ta$ of FIG. 6, and FIG. 7($d$) is a graph showing transformer fluxes of the A-phase, the B-phase, and the C-phase, respectively, after the energization of the three phases when the three-phase circuit breaker 3 is closed at the target closing phase $\theta ta$ of FIG. 6 and energized at the voltage phase $\theta close$.

Referring to FIG. 7, FIG. 7(a) is a graph showing the power-supply voltages ypa, ypb, and ypc of the A-phase, the B-phase, and the C-phase, respectively, and FIG. 7(b) is a graph showing the transformer voltages yta, ytb, and ytc of the A-phase, the B-phase, and the C-phase, respectively, when the three-phase circuit breaker 3 is closed at the target closing phase θta of FIG. 6 and energized at the voltage phase θclose. FIG. 7(c) is a graph showing the absolute values |yia|, |yib|, |yic| of the interpole voltages of the A-phase, the B-phase, and the C-phase, respectively, and the withstanding voltage line ywa when the three-phase circuit breaker 3 is closed at the target closing phase θta of FIG. 6. FIG. 7(d) is a graph showing the transformer fluxes of the A-phase, the B-phase, and the C-phase, respectively, after the energization of the three phases when the three-phase circuit breaker 3 is closed at the target closing phase θta of FIG. 6 and energized at the voltage phase θclose.

As described above in detail, according to the present embodiment, the target closing phase determining circuit 8 calculates the energization flux errors Δφa, Δφb, and Δφc in the respective phases at the respective closing phases of the A-phase of the standard phase based of the followings:

the residual flux values φra, φrb, and φrc of the respective phases;

the pre-arc characteristic and the closing time variation characteristic of the three-phase circuit breaker 3;

the connection condition of the windings of the three-phase transformer 1, to which the three-phase circuit breaker 3 is connected; and the voltage phase differences among the phases of the three-phase power supply 2.

Then, the target closing phase determining circuit 8 determines the target closing phase θta of the A-phase of the standard phase so as to minimize the maximum value of the energization flux errors Δφa, Δφb, and Δφc in the respective phases. Therefore, it is possible to suppress the magnetizing inrush current, which is a transient current generated by the three-phase transformer 1 when the three-phase circuit breaker is energized, with a stability higher than that of the prior art.

In the present embodiment, the residual flux values φra, φrb, and φrc for the respective phases are measured by the residual flux measuring circuit 6, however, the present invention is not limited this, and it is not required to provide the residual flux measuring circuit 6. In this case, the target closing phase determining circuit 8 calculates the energization flux errors Δφa, Δφb, and Δφc in the respective phases based on the followings, instead of using the residual flux values φra, φrb, and φrc:

an upper limit and a lower limit of the residual flux value φra previously measured or estimated;

an upper limit and a lower limit of the residual flux value φrb previously measured or estimated;

an upper limit and a lower limit of the residual flux value φrc previously measured or estimated;

the pre-arc characteristic and the closing time variation characteristic of the three-phase circuit breaker 3;

the connection condition of the windings of the three-phase transformer 1, to which the three-phase circuit breaker 3 is connected; and the voltage phase differences among the phases of the three-phase power supply 2. Concretely speaking, the voltage phases α, β, and γ are changed within the ranges of the equations (1) to (3) as described above at a predetermined interval, respectively, the inclination "r" of the withstanding voltage line is changed with respect to the inclination ra of the withstanding voltage line when the closing phase is θca within the range of the equation (4) at a predetermined interval, and each of the respective residual flux values for the A-phase, the B-phase, and the C-phase is changed within a range between the lower limit and the upper limit. The maximum values of the absolute values of the center values of the transformer fluxes generated in the static state after the energization of the three-phase circuit breaker are set to the energization flux errors Δφa, Δφb, and Δφc in the respective phases at the closing phase θca. With this configuration, even when it is not possible to provide the voltage measuring device 4 and it is not possible to measure the residual flux values φa, φrb, and φrc, it is possible to suppress, in all of the three phases, the magnetizing inrush current as the transient current, which is generated by the three-phase transformer 1 when the three-phase circuit breaker is energized.

Embodiment 2

In the embodiment 1, it is assumed that the contact shoes 3a, 3b, and 3c are closed substantially simultaneously in response to the closing control signal Sc. However, in practice, even if all of the contact shoes 3a, 3b, and 3c are controlled to be closed substantially simultaneously, the closing times of the B-phase and the C-phase will offset with respect to the closing time of the A-phase by predetermined offset amounts of closing time average values.

As compared with the embodiment 1, the embodiment 2 is characterized in that:

(1) the three-phase circuit breaker characteristic memory 7 previously further stores the offset amounts of the closing time average values of the B-phase and the C-phase relative to the closing time of the A-phase of the standard phase; and (2) the target closing phase determining circuit 8 further determines the target closing phase of the three-phase circuit breaker 3 based on the respective offset amounts of the closing time average values relative to the closing time of the A-phase of the standard phase, where the respective offset amounts are provided for the two phases other than the A-phase.

The target closing phase determining circuit 8 reads out the respective offset amounts of the closing time average values of the B-phase and the C-phase relative to the closing time of the A-phase of the standard phase from the three-phase circuit breaker characteristic memory 7, and converts the respective offset amounts of the closing time average values into voltage phase differences. For example, when the offset amounts of the closing time average values of the B-phase and the C-phase relative to the closing time of the standard phase are +1 millisecond and +2 milliseconds, respectively, and when a system frequency is 60 Hz, an offset amount Δdb of the closing phase of the B-phase from 120 degrees is +21.6 degrees, and an offset amount Δdc of the closing phase of the C-phase from 240 degrees is +43.2 degrees.

Considering these offset amounts, the equations (1) to (3) described above are substituted by the following equations (5) to (7), and the target closing phase θta is determined by executing calculations similar to those described above:

$$(\theta ca - \Delta\theta v) \leq \alpha \leq (\theta ca + \Delta\theta v) \quad (5),$$

$$(\theta ca + \Delta db - \Delta\theta v) \leq \beta \leq (\theta ca + \Delta db + \Delta\theta v) \quad (6), \text{ and}$$

$$(\theta ca + \Delta dc - \Delta\theta v) \leq \gamma \leq (\theta ca + \Delta dc + \Delta\theta v) \quad (7).$$

According to the present embodiment, it is possible to further suppress the magnetizing inrush current, which is generated by the three-phase transformer 1 when the three-phase circuit breaker is energized, as compared with the embodiment 1.

Embodiment 3

Figure 8:
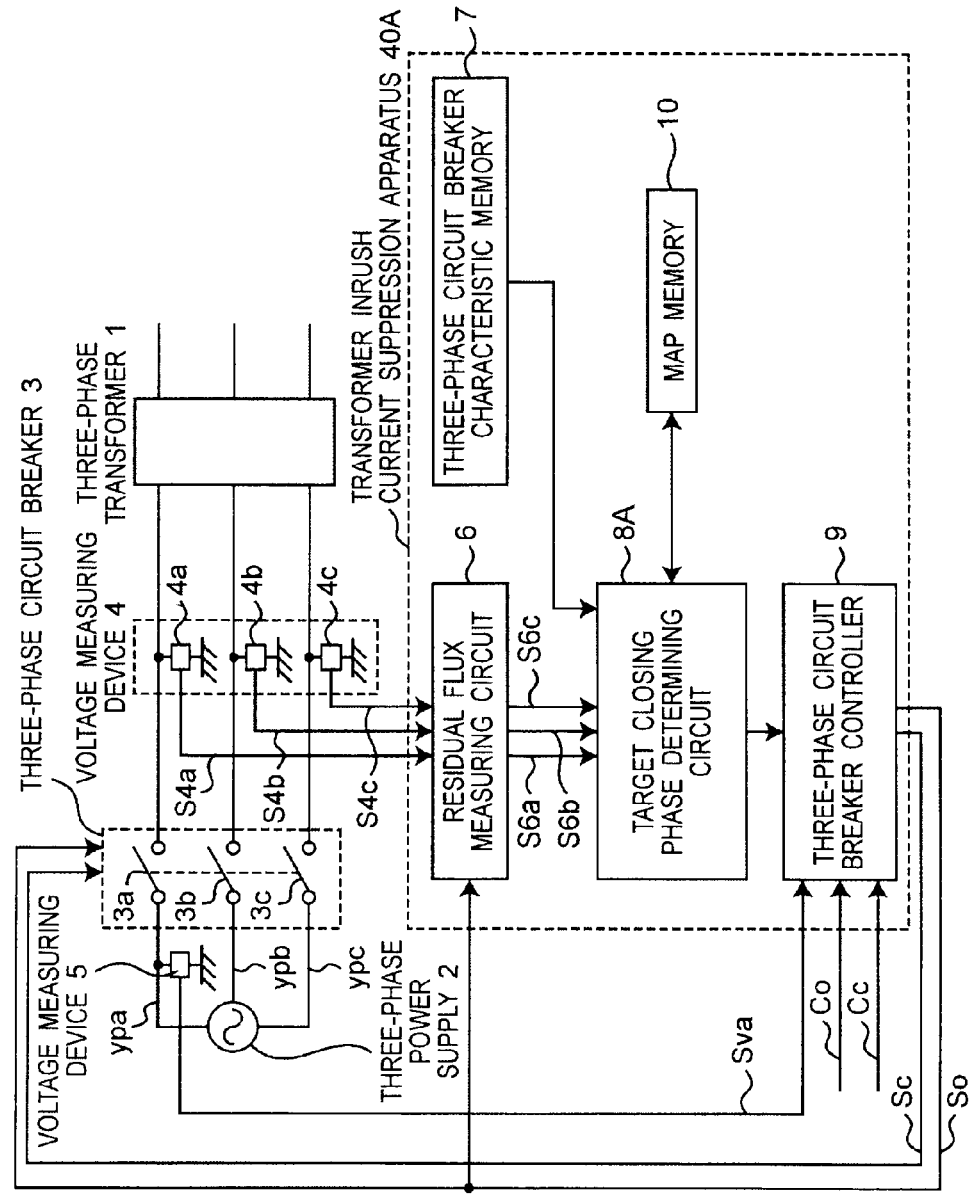
FIG. 8 is a block diagram showing a configuration of a transformer inrush current suppression apparatus 40A according to an embodiment 3 of the present invention.

FIG. 8 is a block diagram showing a configuration of a transformer inrush current suppression apparatus 40A according to an embodiment 3 of the present invention. Referring to FIG. 8, the transformer inrush current suppression apparatus 40A according to the present embodiment is characterized by further including a map memory 10 for storing a map including relations between the residual flux values φra, φrb, and φrc for the respective phases and the target closing phase of the standard phase, and characterized by including a target closing phase determining circuit 8A instead of the target closing phase determining circuit 8, as compared with the transformer inrush current suppression apparatus 40 according to the embodiment 1 (See FIG. 1), Referring to FIG. 8, the target closing phase determining circuit 8A determines the energization flux errors Δφa, Δφb, and Δφc in the respective phases, at the respective closing phases of the standard phase, for respective combinations of the residual flux values φra, φrb, and φrc of an A-phase, a B-phase, and a C-phase, respectively, based on the followings:

the residual flux values of the A-phase, the B-phase, and the C-phase, the pre-arc characteristic and the closing time variation characteristic of the three-phase circuit breaker 3, the connection condition of the windings provided of the three-phase transformer 1, to which the three-phase circuit breaker 3 is connected;

the voltage phase differences among the phases of the three-phase power supply 2; and the offset amounts of the closing time average values of the B-phase and the C-phase relative to the closing time of the A-phase. The target closing phase determining circuit 8A determines the target closing phase for the standard phase so as to substantially minimize an evaluated value related to the energization flux errors Δφa, Δφb, and Δφc in the respective phases. The target closing phase determining circuit 8A creates the map based on the target closing phase of the standard phase determined for each of the combinations of the residual flux values φra, φrb, and φrc for the respective phases, and stores the map in the map memory 10 previously. In this case, the evaluated value is the maximum value of the energization flux errors Δφa, Δφb, and Δφc. The target closing phase determining circuit 8A determines the target closing phase of the standard phase with reference to the map based on the residual flux values φra, φrb, and φrc of the respective phases. With this configuration, it is possible to reduce an amount of the calculation for determining the target closing phase when operating the magnetizing inrush current suppression apparatus 40A, and it is possible to determine the target closing phase at a high speed using an inexpensive calculating apparatus. It should be appreciated that the evaluated value can be a sum of the energization flux errors Δφa, Δφb, and Δφc.

Modified Embodiments

In the respective embodiments described above, the target closing phase determining circuits 8 and 8A may determine the target closing phase of the standard phase so as to minimize a value of the sum of the energization flux errors Δφa, Δφb, and Δφc in the respective phases. With this configuration, it is possible to suppress the magnetizing inrush current, which is generated by the three-phase transformer 1 when the three-phase circuit breaker is energized, in a manner similar to those of the embodiments described above.

In addition, in the embodiments described above, each of the voltage measuring devices 5, 4a, 4b, and 4c measures the voltage of the three-phase power supply 2 at a side of primary windings of the three-phase transformer 1, however, the present invention is not limited to this. Each of the voltage measuring devices 5, 4a, 4b, and 4c may measure a voltage of at a side of secondary or tertiary windings of the three-phase transformer 1. In addition, the voltage measuring devices 5, 4a, 4b, and 4c measure the voltages to the ground of the respective phases, where the voltages are outputted from the three-phase power supply 2, however, the present invention is not limited to this. For example, the voltage measuring devices 5, 4a, 4b, and 4c may measure interphase voltages.

Further, it is possible to configure the three-phase circuit breaker controller 9 in a manner similar to that of the closing control means as disclosed in Patent Document 2 or control signal output means as disclosed in the Patent Document 3.

Still further, since the sum of residual fluxes φra, φrb, and φrc of the three phases is zero, only two voltage measuring devices of the voltage measuring devices 4a, 4b, and 4c may be provided. In this case, residual flux measuring circuit 6 may calculate residual flux values of two phases, and calculate a residual flux value of a remaining phase as a reverse sign of a sum of calculated residual flux values of the two phases. In addition, the opening phase of the three-phase circuit breaker 3 may be controlled so that the residual fluxes φra, φrb, and φrc become predetermined values. In this case, the voltage measuring device 4 and the residual flux measuring circuit 6 are not provided, and the predetermined values are outputted to the target closing phase determining circuit 8, 8A.

INDUSTRIAL APPLICABILITY

As described above in detail, the transformer inrush current suppression apparatus according to the present invention includes target closing phase determining means for determining energization flux errors in respective first to third phases at respective closing phases of the first phase, and for determining a target closing phase of the first phase so as to substantially minimize an evaluated value related to determined energization flux errors in the first to third phases, where each of the energization flux errors being a maximum value of absolute values of center values of transformer fluxes generated in a static state after energization. The three-phase circuit breaker controller means controls the three-phase circuit breaker to be closed at a timing corresponding to a determined target closing phase of the first phase. The target closing phase determining means determines the energization flux errors in the respective phases at the respective closing phases of the first phase based on residual flux values for the first to third phases of the three-phase power supply, respectively, a pre-arc characteristic and a closing time variation characteristic of the three-phase circuit breaker, a connection condition of windings of the three-phase transformer, to which the three-phase circuit breaker is connected, voltage phase differences among the phases of the three-phase power supply. Therefore, it is possible to suppress a magnetizing inrush current for all of the three phases.

REFERENCE SIGNS LIST

1 Three-Phase Transformer, 2 Three-Phase Power Supply, 3 Three-Phase Circuit Breaker, 3a, 3b and 3c Contact, 4, 4a, 4b, 4c and 5 Voltage Measuring Device, 6 Residual Flux Measuring Circuit, 7 Three-Phase Circuit Breaker Characteristic Memory, 8 and 8a Target Closing Phase Determining Circuit, 9 Three-Phase Circuit Breaker Controller, 10 Map Memory, 40 and 40a Transformer Inrush Current Suppression apparatus, L1, L2 and L3 Winding.

The invention claimed is:

1. A transformer inrush current suppression apparatus for suppressing a magnetizing inrush current generated by a three-phase transformer when the three-phase transformer is energized by a three-phase circuit breaker, which energizes the three-phase transformer with a three-phase power supply by simultaneous three-phase energizing, the transformer inrush current suppression apparatus comprises:
  a target closing phase determining circuit for calculating energization flux errors in first to third phases by changing a closing phase of the first phase within a range from 0 degrees to 360 degrees, and for determining a target closing phase which minimizes an evaluated value of the energization flux errors in the first to third phases, each of the energization flux errors corresponding to a maximum offset amount of center values of transformer fluxes generated in a static state after the three-phase circuit breaker is energized when the three-phase circuit breaker is closed; and
  a three-phase circuit breaker controller for controlling the three-phase circuit breaker to be closed at the target closing phase determined by the target closing phase determining circuit, and
  wherein the target closing phase determining circuit calculates the energization flux errors in the first to third phases based on
  residual flux values for the first to third phases of the three-phase transformer,
  a variation in an inclination of a withstanding voltage line, the variation being due to a pre-arc characteristic of the three-phase circuit breaker,
  a variation in closing time of the three-phase circuit breaker, and
  a connection condition of windings of the three-phase transformer, to which the three-phase circuit breaker is connected,
  while changing the inclination of the withstanding voltage line and the closing time within ranges including values the inclination of the withstanding voltage line and the closing time can have,
  wherein the evaluated value is a sum of the energization flux errors in the first to third phases.

2. A transformer inrush current suppression apparatus for suppressing a magnetizing inrush current generated by a three-phase transformer when the three-phase transformer is energized by a three-phase circuit breaker, which energizes the three-phase transformer with a three-phase power supply by simultaneous three-phase energizing, the transformer inrush current suppression apparatus comprises:
  a target closing phase determining circuit for calculating energization flux errors in first to third phases by changing a closing phase of the first phase within a range from 0 degrees to 360 degrees, and for determining a target closing phase which minimizes an evaluated value of the energization flux errors in the first to third phases, each of the energization flux errors corresponding to a maximum offset amount of center values of transformer fluxes generated in a static state after the three-phase circuit breaker is energized when the three-phase circuit breaker is closed; and
  a three-phase circuit breaker controller for controlling the three-phase circuit breaker to be closed at the target closing phase determined by the target closing phase determining circuit, and
  wherein the target closing phase determining circuit calculates the energization flux errors in the first to third phases based on
  residual flux values for the first to third phases of the three-phase transformer,
  a variation in an inclination of a withstanding voltage line, the variation being due to a pre-arc characteristic of the three-phase circuit breaker,
  a variation in closing time of the three-phase circuit breaker, and
  a connection condition of windings of the three-phase transformer, to which the three-phase circuit breaker is connected,
  while changing the inclination of the withstanding voltage line and the closing time within ranges including values the inclination of the withstanding voltage line and the closing time can have,
  wherein the target closing phase determining circuit further determines the energization flux errors based on offset amounts of closing time average values relative to the closing time of the first phase, the offset amounts being provided for two phases other than the first phase.

3. A transformer inrush current suppression apparatus for suppressing a magnetizing inrush current generated by a three-phase transformer when the three-phase transformer is energized by a three-phase circuit breaker, which energizes the three-phase transformer with a three-phase power supply by simultaneous three-phase energizing, the transformer inrush current suppression apparatus comprises:
  a target closing phase determining circuit for calculating energization flux errors in first to third phases by changing a closing phase of the first phase within a range from 0 degrees to 360 degrees, and for determining a target closing phase which minimizes an evaluated value of the energization flux errors in the first to third phases, each of the energization flux errors corresponding to a maximum offset amount of center values of transformer fluxes generated in a static state after the three-phase circuit breaker is energized when the three-phase circuit breaker is closed; and
  a three-phase circuit breaker controller for controlling the three-phase circuit breaker to be closed at the target closing phase determined by the target closing phase determining circuit, and wherein the target closing phase determining circuit calculates the energization flux errors in the first to third phases based on residual flux values for the first to third phases of the three-phase transformer, a variation in an inclination of a withstanding voltage line, the variation being due to a pre-arc characteristic of the three-phase circuit breaker, a variation in closing time of the three-phase circuit breaker, and a connection condition of windings of the three-phase transformer, to which the three-phase circuit breaker is connected, while changing the inclination of the withstanding voltage line and the closing time within ranges including values the inclination of the withstanding voltage line and the closing time can have, wherein the target closing phase determining circuit determines the energization flux errors in the respective phases at the respective closing phases of the first phase based on the following:

an upper limit and a lower limit of the residual flux value for the first phase;

an upper limit and a lower limit of the residual flux value for the second phase;

an upper limit and a lower limit of the residual flux value for the third phase;

the variation in the inclination of the withstanding voltage line, the variation being due to the pre-arc characteristic of the three-phase circuit breaker;

the variation in closing time of the three-phase circuit breaker;

the connection condition of the windings of the three-phase transformer, to which the three-phase circuit breaker is connected; and voltage phase differences.

4. A transformer inrush current suppression apparatus for suppressing a magnetizing inrush current generated by a three-phase transformer when the three-phase transformer is energized by a three-phase circuit breaker, which energizes the three-phase transformer with a three-phase power supply by simultaneous three-phase energizing, the transformer inrush current suppression apparatus comprises:

a target closing phase determining circuit for calculating energization flux errors in first to third phases by changing a closing phase of the first phase within a range from 0 degrees to 360 degrees, and for determining a target closing phase which minimizes an evaluated value of the energization flux errors in the first to third phases, each of the energization flux errors corresponding to a maximum offset amount of center values of transformer fluxes generated in a static state after the three-phase circuit breaker is energized when the three-phase circuit breaker is closed; and a three-phase circuit breaker controller for controlling the three-phase circuit breaker to be closed at the target closing phase determined by the target closing phase determining circuit, and wherein the target closing phase determining circuit calculates the energization flux errors in the first to third phases based on residual flux values for the first to third phases of the three-phase transformer, a variation in an inclination of a withstanding voltage line, the variation being due to a pre-arc characteristic of the three-phase circuit breaker, a variation in closing time of the three-phase circuit breaker, and a connection condition of windings of the three-phase transformer, to which the three-phase circuit breaker is connected, while changing the inclination of the withstanding voltage line and the closing time within ranges including values the inclination of the withstanding voltage line and the closing time can have, further comprising:

a map memory for storing a map including relations between the residual flux values for the respective phases and the target closing phase, wherein the target closing phase determining circuit determines the energization flux errors in the respective phases, at the respective closing phases of the first phase, for respective combinations of the residual flux values for the first to third phases based on the following:

the residual flux values for the first to third phases;

the variation in the inclination of the withstanding voltage line, the variation being due to the pre-arc characteristic of the three-phase circuit breaker;

the variation in closing time of the three-phase circuit breaker;

the connection condition of the windings of the three-phase transformer, to which the three-phase circuit breaker is connected; and the voltage phase differences, wherein, for the respective combinations of the residual flux values for the first to third phases, the target closing phase determining circuit determines the target closing phases of the first phase so as to minimize the evaluated value related to the energization flux errors in the first to third phases, wherein the target closing phase determining circuit creates the map based on the target closing phases of the first phases determined for the respective combinations of the residual flux values for the first to third phases, and previously stores the map in the map memory, wherein the target closing phase determining circuit determines the target closing phase of the first phase with reference to the map based on the residual flux values for the first to third phases.

* * * * *